United States Patent [19]
Davis

[11] Patent Number: 5,828,753
[45] Date of Patent: Oct. 27, 1998

[54] CIRCUIT AND METHOD FOR ENSURING INTERCONNECT SECURITY WITHIN A MULTI-CHIP INTEGRATED CIRCUIT PACKAGE

[75] Inventor: Derek L. Davis, Phoenix, Ariz.

[73] Assignee: Intel Corporation, Santa Clara, Calif.

[21] Appl. No.: 735,976

[22] Filed: Oct. 25, 1996

[51] Int. Cl.[6] .................................................. H04L 9/00
[52] U.S. Cl. ................................................ 380/49; 380/4
[58] Field of Search ........................................... 380/49, 4

[56] References Cited

U.S. PATENT DOCUMENTS

| | | |
|---|---|---|
| 5,377,264 | 12/1994 | Lee et al. . |
| 5,396,609 | 3/1995 | Schmidt et al. . |
| 5,428,685 | 6/1995 | Kadooka et al. . |
| 5,483,596 | 1/1996 | Rosenow et al. . |
| 5,559,883 | 9/1996 | Williams . |
| 5,596,718 | 1/1997 | Boebert et al. ............................ 380/49 |
| 5,615,263 | 3/1997 | Takahashi et al. ......................... 380/49 |

*Primary Examiner*—David Cain
*Attorney, Agent, or Firm*—Blakely, Sokoloff, Taylor & Zafman

[57] ABSTRACT

Circuitry implemented within a multi-chip module comprising a first integrated circuit chip and a second integrated circuit chip coupled together through an interconnect. Both the first and second integrated circuit chips include a cryptographic engine coupled to the interconnect and a non-volatile memory element used to contain key information. These cryptographic engines are solely used to encrypt outgoing information being output across the interconnect or to decrypt incoming information received from the interconnect. This prevents fraudulent physical attack of information transmitted across the interconnect.

28 Claims, 4 Drawing Sheets

CIRCUIT AND METHOD FOR ENSURING INTERCONNECT SECURITY WITHIN A MULTI-CHIP INTEGRATED CIRCUIT PACKAGE

BACKGROUND OF THE INVENTION

1. Field of the Invention

The present invention relates to the field of cryptography. More particularly, the present invention relates to a circuit and method for protecting digital information transferred between integrated circuits of a multi-chip module.

2. Description of Art Related to the Invention

Currently, many companies are now using personal computers and centralized mainframes to store sensitive information (e.g., confidential, proprietary, etc.) in digital form and to perform logical operations utilizing this information. These operations may include, but are not limited to adjusting credit card account balances, bank account balances, metering electronic content usage, applying digital signatures to electronic documents or contracts, etc. Due to the sensitive nature of this information, it has become desirable to ensure that its integrity is protected upon being transmitted outside the physical confines of the computer casing as well as during transmission within the casing.

Ideally, digital information may be protected within the computer by encrypting the data before it is transmitted through bus lines that support communications between electronic components each containing an integrated circuit ("IC") chip. Additionally, to reduce the risk of recovery of digital information stored or processed on-chip, normally accomplished by removing a portion of a single chip package covering the surface of the IC chip and directly examining the IC chip itself, the package may be made of a special packaging material or the integrated circuit may be coated with a special material within the package. These techniques have been in limited use for a number of years in order to protect integrated circuits, targeting the military market, by increasing the difficulty of exposing the integrated circuit through etching, dissolving or grinding away without damaging the surface of the IC chip.

However, for multi-chip packages containing a plurality of IC chips and an interconnect used to transfer information in a non-encrypted format between these IC chips, the special packaging material does not ensure, with a high degree of probability, that a physical attack on the interconnect will be unsuccessful. "Physical attack" is defined as an attempt in recovering sensitive information in a non-encrypted format directly from the internal circuitry of the integrated circuit. The reason that the multi-chip package is particularly susceptible to a physical attack is that access to sensitive data may be achieved directly on the interconnect rather than on the IC chip itself.

In the last few years, the use of multi-chip packages has increased dramatically in order to take advantage of semiconductor fabrication processes improved for different types of circuitry (e.g., memory and logic circuitry). For example, a logic process is typically improved for high performance, high transistor density, and low power with different priorities based on the specific target market. On the other hand, a memory process is typically improved for high memory density, with less emphasis on logic transistor density or performance. However, information transferred between IC chips within a multi-chip package is susceptible to fraudulent modification or illicit observation because the packaging material proximate to the interconnect may be removed without harming any of the IC chips. Thus, systems utilizing a multi-chip module are susceptible to fraud by unauthorized persons unless an additional protective mechanism is implemented.

Therefore, it would be advantageous to develop a multi-chip integrated circuit package (commonly referred to as a "multi-chip module") that is designed to greatly mitigate the probability of successful physical attack.

SUMMARY OF THE INVENTION

The present invention relates to a multi-chip module comprising an interconnect, a first integrated circuit chip and a second integrated circuit chip. The first integrated circuit chip includes a first cryptographic engine which is coupled to the interconnect. The second integrated circuit chip includes a second cryptographic engine which is coupled to the interconnect.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention relates to a circuit and technique for ensuring digital information, transmitted through an interconnect between individual IC chips of a multi-chip module, is protected from physical attack. In the following description, some terminology is used to discuss certain well-known cryptographic functions. For example, "information" is one or more bits of data, address, and/or control information. A "key" is an encoding and/or decoding parameter used by conventional cryptographic function such as Rivest, Shamir and Adleman ("RSA"), a Data Encryption Algorithm as specified in Data Encryption Standard ("DES") and the like. A "cryptographic function" (commonly referred to as a "cipher") is a mathematical function used for encryption and decryption. A "digital signature" is a sequence of information typically used for authentication purposes. The digital signature is created by applying a cipher to the information using a key to produce an encrypted sequence of information.

Figure 1:
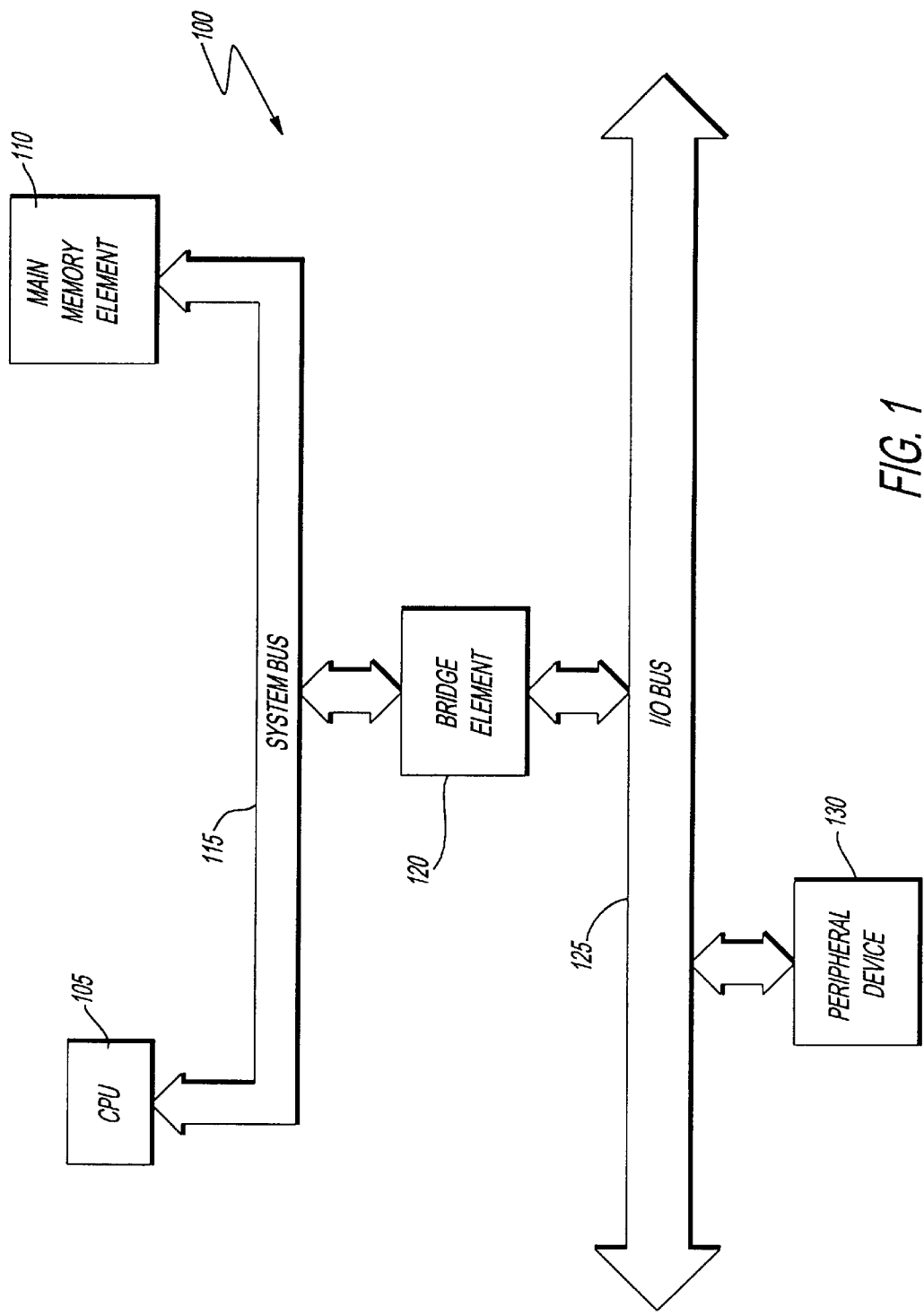
FIG. 1 is an illustrative block diagram of an electronic system including the present invention as a multi-chip module employed as a bridge element.

Referring to FIG. 1, an illustrative embodiment of a computer system 100 employing the present invention is shown. The computer system 100 comprises a central processing unit ("CPU") 105 and a main memory element 110 (e.g., random access memory "RAM", cache, etc.) coupled to a system bus 115. A bridge element 120 operates as an interface between the system bus 115 and an input/output ("I/O") bus 125 having at least one peripheral device 130 coupled thereto. The I/O bus 125 may include a Peripheral Component Interconnect ("PCI") bus, Industry Standard Architecture ("ISA") bus and the like. Additionally, the peripheral device 130 may include, but is not limited to, a mass storage device (e.g., a hard drive, CD ROM, network interface circuit card, and the like). As a result, the bridge element 120 provides a communication path for information to be exchanged between the peripheral device 130 and the CPU 105 or main memory element 110 coupled to the system bus 115.

It is contemplated that the bridge element 120 may be configured as a multi-chip module incorporating both logic circuitry and memory as separate integrated circuits coupled together through an interconnect. Examples of the bridge element may include, but is not limited to a Triton II™ chip set manufactured by Intel Corporation of Santa Clara, Calif. However, an embodiment of the present invention may be utilized by any electronic device implemented within a multi-chip module. For example, the CPU 105 may be implemented as a multi-chip module in which the processor core and on-chip cache may be separate IC chips representing logic circuitry and memory, respectively.

Figure 2:
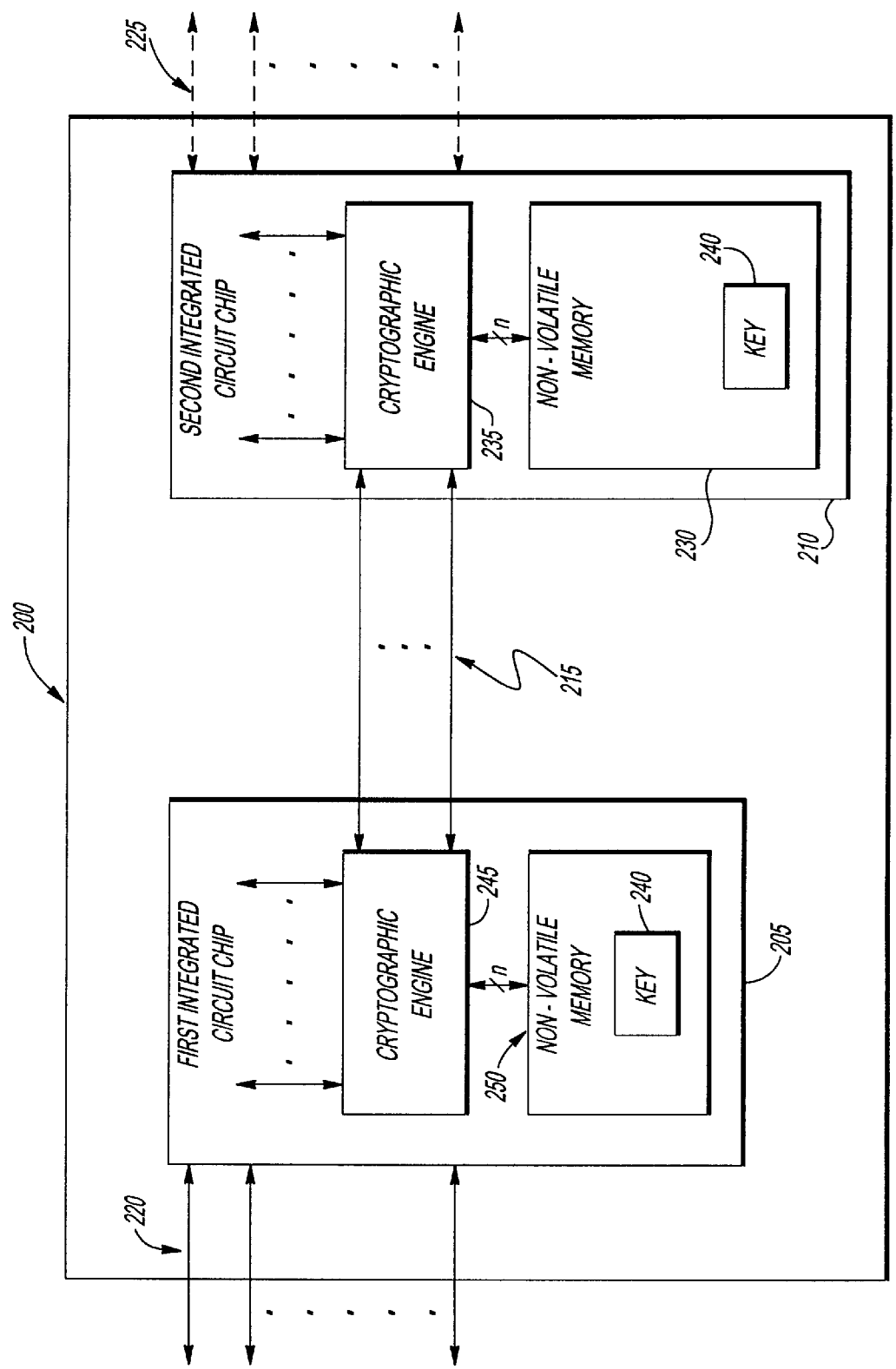
FIG. 2 is a block diagram of a preferred embodiment of the multi-chip module optimally shown as the bridge element of FIG. 1.

Referring now to FIG. 2, an embodiment of a multi-chip module protecting digital information exchanged between two integrated circuit chips is shown. The multi-chip module 200 includes a first integrated circuit chip 205 and a second integrated circuit chip 210 coupled together through an interconnect 215. The interconnect 215 includes a plurality of communication signal lines providing bi-directional (or uni-directional) communications between the first and second integrated circuit chips 205 and 210. The multi-chip module 200 further includes a first plurality of I/O ports 220, and optionally, a second plurality of I/O ports 225. The first plurality of I/O ports 220 are used to provide information to and receive information from the first integrated circuit chip 205 while the second plurality of I/O ports 225, if implemented, are used to provide information to and receive information from the second integrated circuit chip 210.

One embodiment of the multi-chip module 200 features the second integrated circuit chip 210 as memory 230 including a small amount of support logic. The support logic includes a cryptographic engine 235 designed to perform cryptographic operations in accordance with a selected stream cipher such as, for example, "RC4" provided by RSA Data Security, Inc. of Redwood City, Calif., although other stream ciphers may be used. The cryptographic engine 235 is primarily dedicated for the purpose of (i) encrypting information within the second integrated circuit chip 210 prior to transmission through the interconnect 215 and (ii) decrypting information received over the interconnect 215.

The memory 230 may be non-volatile memory, such as erasable programmable read-only memory ("EPROM"), electrically erasable programmable read-only memory ("EEPROM") and various other types of flash memory. Contained within memory 230 is key information (referred to as a "security key") 240 which is generated and stored in the non-volatile memory of the multi-chip module 200, normally at manufacture. It is contemplated that the security key 240 may be produced after manufacture of the multi-chip module 200 by an original equipment manufacturer or a trusted authority (e.g., trade association, governmental entity, etc.). The security key 240 may be used as a symmetric key by both the first and second integrated circuits 205 and 210, namely their cryptographic engines, to encrypt and decrypt the information or to establish a "session" key used for that purpose.

Referring still to FIG. 2, the first integrated circuit chip 205 is logic circuitry (e.g., a processor core, etc.), including a small amount of non-volatile memory. The logic circuitry includes a cryptographic engine 245 which is also used for the encryption of outgoing information within the first integrated circuit 205 prior to transmission through the interconnect 215 and the decryption of incoming information received over the interconnect 215. The small amount of non-volatile memory 250 is used to contain the security key 240 also placed therein at manufacture. It is contemplated, however, that the logic circuitry may further include a random number generator (not shown) to produce the security key, or perhaps the session key, during initialization.

During communication between the two integrated circuit chips 205 and 210 in an effort to securely transfer digital information, one of the cryptographic engines at the source (e.g., cryptographic engine 245 in the first integrated circuit chip 205) is used to create a pseudo-random stream based on the security key contained within its non-volatile memory. The pseudo-random stream is logically XOR'ed with the digital information in its non-encrypted form prior to transmission to the cryptographic engine at the destination (e.g., cryptographic engine 235). This XOR'ing may be performed in serial bitwise fashion or in parallel with any number of bits in order to encrypt the digital information. At the destination, the cryptographic engine is used to decrypt the incoming information by again XOR'ing that digital information with portions of the similarly-generated, pseudo-random stream in order to obtain the information in a non-encrypted form. This mechanism provides for the generation of the two pseudo-random streams remains in synchronization, typically assured by processing the same amount of information at both the destination and source devices. This assures that the pseudo-random stream is "consumed" at a matching rate by both integrated circuit chips. Note that the above procedures are directed to the use of "RC4" cipher, but it is anticipated that other stream ciphers that may not use pseudo-random streams may be employed.

Figure 3:
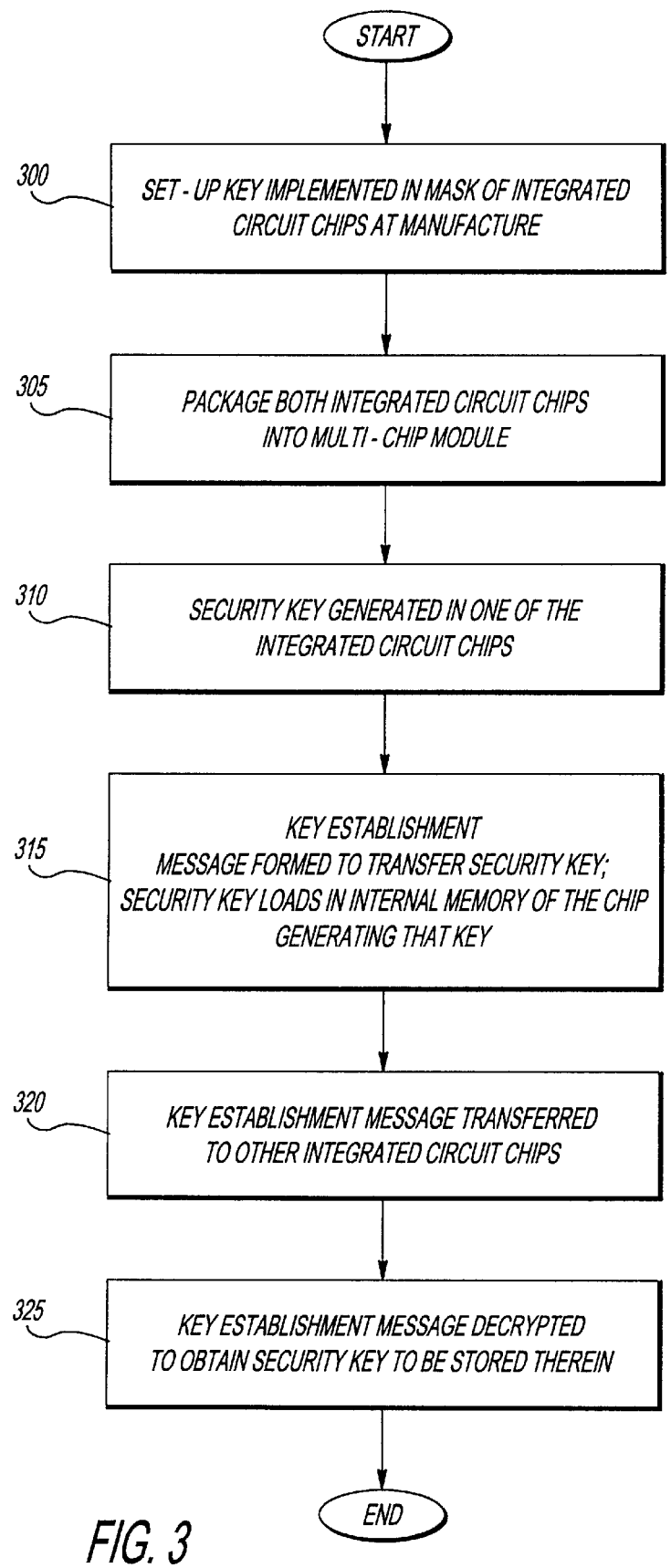
FIG. 3 is an illustrative flowchart of the initialization procedure performed by the multi-chip module of FIG. 2.

Referring now to FIG. 3, a flowchart illustrating the initialization procedure of the embodiment performed at manufacture in order to load the security key within both the first and second integrated circuit chips of the multi-chip module is shown. When the first and second integrated circuit chips are manufactured as individual dice, such as a flash die and a logic die for example, a set-up key is implemented into their masks (Step 300). The set-up key is a fixed number and is static in nature. Next, the flash and logic dice are packaged to create a multi-chip module (Step 305). These dice are powered up, causing one of the dice, such as the logic die, to initially generate a random number internally or obtain a random number externally to be used as the security key (Step 310). The logic die encrypts the security key with the set-up key to produce an encrypted "key establishment message" and loads the security key into its non-volatile memory (Step 315). Thereafter, the logic die transmits the key establishment message to the flash die (Step 320).

Next, the flash die decrypts the key establishment message with its copy of the set-up key to obtain the security key and stores the security key in its non-volatile memory (Step 325). Thereafter, the security key may be used as a symmetric key for exchanging a session key to conduct high-speed cryptographic communications between both integrated circuit chips.

Figure 4:
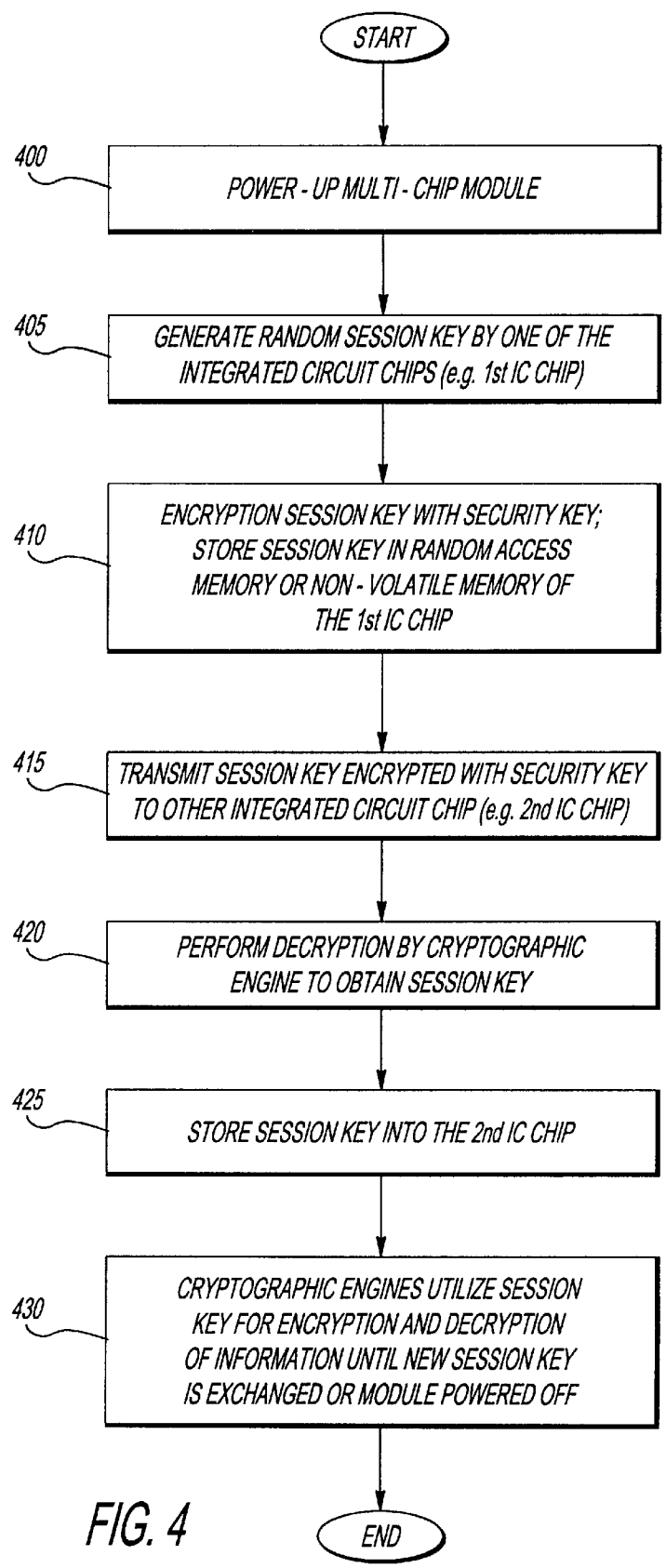
FIG. 4 is an illustrative flowchart of the normal operations of the multi-chip module of FIG. 2.

Referring now to FIG. 4, a flowchart illustrating the normal operations of a multi-chip module in order to protect digital information transmitted through the interconnect is shown. First, the multi-chip module is powered up (Step 400). Thereafter, the first integrated circuit chip begins execution of instructions in its own ROM initially, and during that process, it generates a random session key (Step 405). Next, the first integrated circuit chip encrypts the session key with the security key which is stored in non-volatile memory of both the first and second integrated circuit chips (Step 410). Then, the first integrated circuit chip transmits the session key, encrypted with the security key, to the second integrated circuit chip (Step 415). The second integrated circuit chip decrypts the encrypted session key to retrieve the session key in a non-encrypted form and stores the session key within any storage facilities (e.g., non-volatile memory, RAM, registers, etc.) of the second integrated circuit chip (Steps 420–425). From that point, the cryptographic engines utilize the session key to produce the pseudo-random stream which is used either to encrypt digital information transmitted through the interconnect or to decrypt digital information upon receiving encrypted digital information via the interconnect (Step 430).

While certain embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A multi-chip module comprising:

an interconnect;

a first integrated circuit chip including a first cryptographic engine, the first cryptographic engine being coupled to the interconnect;

a second integrated circuit chip including a second cryptographic engine, the second cryptographic engine being coupled to the interconnect; and a package containing the first integrated circuit chip and the second integrated circuit chip.

2. The multi-chip module according to claim 1, wherein the first integrated circuit chip further includes a non-volatile memory element, the non-volatile memory element to contain key information to be used by the first cryptographic engine for encryption of outgoing digital information before transmission over the interconnect and for decryption of incoming digital information received by the first cryptographic engine over the interconnect.

3. The multi-chip module according to claim 1, wherein the second integrated circuit chip further includes a non-volatile memory element, the non-volatile memory element to contain key information to be used by the second cryptographic engine for encryption of outgoing digital information before transmission over the interconnect and for decryption of incoming digital information received by the second cryptographic engine over the interconnect.

4. The multi-chip module according to claim 1, wherein the first integrated circuit chip to execute a stream cipher algorithm to encrypt the outgoing digital information and alternatively to decrypt the incoming digital information.

5. The multi-chip module according to claim 1, wherein the first cryptographic engine is dedicated to perform cryptographic operations on the outgoing digital information before transmission through the interconnect, and alternatively on the incoming digital information upon receipt over the interconnect.

6. The multi-chip module according to claim 1, wherein the first integrated circuit chip includes logic circuitry and an on-chip, non-volatile memory element, the on-chip, non-volatile memory element to contain key information to be used by the first cryptographic engine to establish a session key used to encrypt digital information before transferring to the second integrated circuit chip over the interconnect and to decrypt incoming digital information received by the first cryptographic engine over the interconnect.

7. The multi-chip module according to claim 6 further including a random number generator.

8. The multi-chip module according to claim 7, wherein the random number generator produces at least the key information.

9. The multi-chip module according to claim 6, wherein the second integrated circuit chip includes memory and support logic.

10. An electronic device encapsulated within a multi-chip module, the electronic device comprising:

first circuit means for processing information, the first circuit means including logic for encrypting outgoing digital information prior to transmission for decrypting incoming digital information after receipt;

second circuit means for storing information, the second circuit means including logic for encrypting the second set of digital information prior to outputting digital information to the first circuit means and for decrypting outgoing digital information from the first circuit means after receipt;

connection means for interconnecting the first circuit means with the second circuit means; and packaging means for containing the first circuit means and the second circuit means.

11. The electronic device according to claim 10, wherein the first circuit means includes a first cryptographic engine and a first internal memory storing key information used for encrypting the outgoing digital information before transmission to the second circuit means and alternatively decrypting the digital information from the second circuit means.

12. The electronic device according to claim 11, wherein the first circuit means further includes a random number generator.

13. The electronic device according to claim 11, wherein the second circuit means includes a second cryptographic engine and a second internal memory storing key information used for encrypting the digital information output to the first circuit means and alternatively decrypting the outgoing digital information from the first circuit means.

14. A computer system comprising:

a memory element; and a central processing unit coupled to the memory element, the central processing unit, being packaged as a multi-chip module, including a first integrated circuit chip including a first cryptographic engine and a first internal memory element, a second integrated circuit chip including a second internal memory element and control logic including at least a second cryptographic engine, an interconnect coupled to both the first integrated circuit chip and the second integrated circuit chip, and a package containing the first integrated circuit chip, the second integrates circuit chip, and the interconnect.

15. The computer system according to claim 14, wherein the first internal memory element of the first integrated circuit chip includes an on-chip cache to contain key information to be used by the first cryptographic engine for encryption of outgoing digital information transmission over the interconnect and for decryption of incoming digital information received by the first cryptographic engine over the interconnect.

16. The computer system according to claim 14, wherein the second integrated circuit chip further includes a non-volatile memory element, the non-volatile memory element to contain key information to be used by the second cryptographic engine for encryption of outgoing digital information before transmission over the interconnect and for decryption of incoming digital information received by the second cryptographic engine over the interconnect.

17. The computer system according to claim 16, wherein the second internal memory element of the second integrated circuit chip includes an off-chip cache.

18. The computer system according to claim 14, wherein the first integrated circuit chip of the central processing unit to execute a stream cipher algorithm to encrypt the outgoing digital information and alternatively to decrypt the incoming digital information.

19. The computer system according to claim 14, wherein the first cryptographic engine is dedicated to performing cryptographic operations on the outgoing digital information before transmission through the interconnect, and alternatively, on the incoming digital information upon receipt over the interconnect.

20. The computer system according to claim 17, wherein the first integrated circuit chip includes a processor core including the first cryptographic engine and the first internal memory element that to contain key information to be used by the first cryptographic engine to establish a session key used to encrypt outgoing digital information before transmission to the second integrated circuit chip over the interconnect, and to decrypt incoming digital information received by the first cryptographic engine over the interconnect.

21. The computer system according to claim 20, wherein the first integrated circuit chip includes a random number generator.

22. A method of transferring digital information between a first and second integrated circuit chips interconnected by an interconnect and implemented within a multi-chip module, the method comprising generating a session key by the first integrated circuit chip;

encrypting the session key with a symmetric key stored in a non-volatile memory element of the first integrated circuit chip at manufacture to produce a message;

transferring the message through the interconnect;

decrypting the message with the symmetric key stored in a non-volatile memory element of the second integrated circuit chip to retrieve the session key; and utilizing the session key for communications between the first integrated circuit chip and the second integrated circuit chip of the multi-chip module.

23. A method for initialization of a multi-chip module having at least two integrated circuit chips connected together by an interconnect, the method comprising:

implementing static key into masks of a first integrated chip and a second integrated circuit chip;

packaging the first integrated circuit chip and the second integrated circuit chip into the multi-chip module;

powering the first integrated circuit chip and the second integrated circuit chip so that a randomly generated key is loaded into the first integrated circuit chip;

encrypting the randomly generated key with the static key to produce a message;

transferring the message to the second integrated circuit chip;

decrypting the message to retrieve the randomly generated key; and utilizing the randomly generated key by both the first integrated circuit chip and the second integrated circuit chip to exchange session keys for secured communication over the interconnect.

24. The multi-chip module of claim 1, wherein the first integrated circuit chip includes a processor.

25. The multi-chip module of claim 24, wherein the second integrated circuit chip includes non-volatile memory.

26. The multi-chip module of claim 1, wherein the package includes a multi-chip semiconductor package.

27. The multi-chip module of claim 1, wherein the package includes a circuit board upon which both the first integrated circuit chip and the second integrated circuit chip are mounted.

28. The multi-chip module of claim 1, wherein the package further contains the interconnect.

* * * * *